J. M. ALBERTSON.

Horse-Power.

No. 6,247.

Reissued Jan. 26, 1875.

WITNESSES.

Coleby C. Jeffery

Nath. N. Chapman

INVENTOR.

James M. Albertson

THE GRAPHIC CO. PHOTO-LITH. 39 & 41 PARK PLACE, N.Y.

UNITED STATES PATENT OFFICE.

JAMES M. ALBERTSON, OF NEW LONDON, CONNECTICUT.

IMPROVEMENT IN HORSE-POWERS.

Specification forming part of Letters Patent No. 89,825, dated May 4, 1869; reissue No. 6,247, dated January 26, 1875; application filed November 27, 1874.

*To all whom it may concern:*

Be it known that I, JAMES M. ALBERTSON, of New London, State of Connecticut, have invented certain Improvements in Horse-Powers, of which the following is a specification:

This invention relates to certain improvements in that class of horse-powers where the machine is placed on the ground-floor of a building in the center of the horse-path, and the power transmitted to machines placed on the floor above by means of a belt, without the use of long shafts extending outside of the horse-path, and is peculiarly applicable to cotton-gin houses as usually constructed, and also to other similar purposes.

Figure 1:
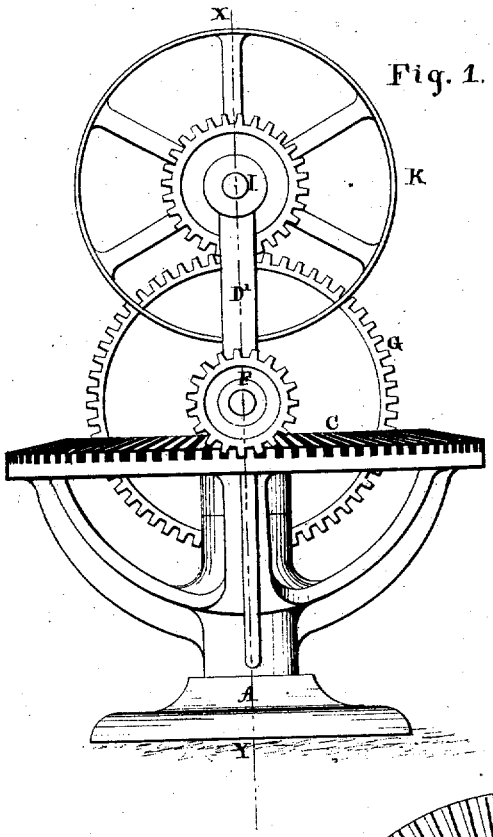
Figure 2:
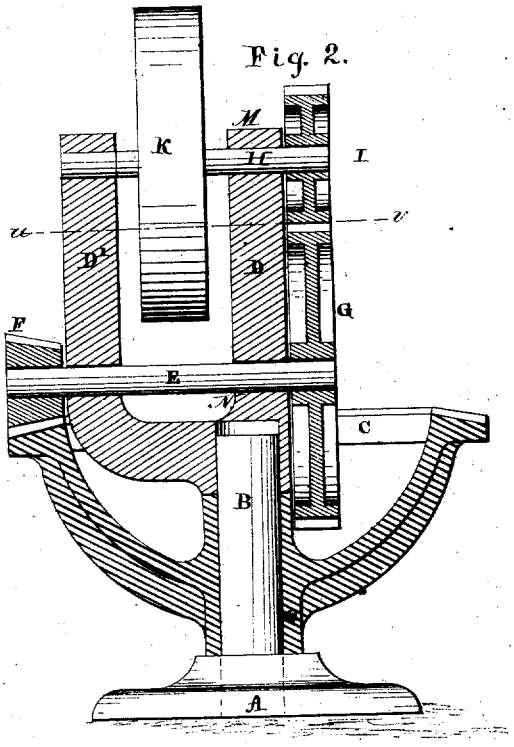
Figure 3:
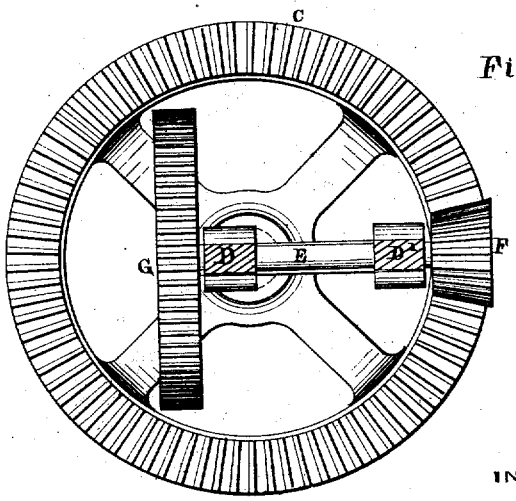

In the accompanying drawing, Figure 1 is an elevation of a machine embodying my invention. Fig. 2 is a vertical section of same. Fig. 3 is a horizontal section of same.

Like letters in all refer to like parts.

A is a base or collar, which surrounds the spindle B, and forms its foundation, and also sustains the weight of the gear-wheel C. From A, extending upward, is a central shaft or spindle, B, about which the gear-wheel or principal gear C revolves. This spindle B is continued upward to any desired height above the face of the wheel C, and may be continued upward until it reaches the floor above, and be attached thereto for additional support, and is provided with bearings M and N, and a branch or arm, D′, which extends outward nearly to the rim of this wheel, and contains bearings for counter-shaft E. This counter-shaft carries upon its outer end the pinion F, and upon its other end the gear-wheel G, and passes through the central column B before reaching the wheel G. For increasing the speed the central column B may be continued upward to a still greater height, and provided with an additional counter-shaft, H, supporting a pinion gearing with the wheel G, and carrying a belt-pulley, K; and should a further increase of speed be required by continuing up the spindle B, any number of these counter-shafts, gearing with each other, and ending with a belt-pulley, or equivalent, may be added. I do not, therefore, confine myself to any particular number of these shafts, as their number in no way changes the principles or object of my invention.

In constructing the machine the central spindle, B, is made of a size and strength sufficient to support the weight of the entire machinery of the horse-power, and also to resist the direct and torsional strain thrown upon it in working, the whole arrangement being above the face of the wheel C. The entire weight and strain of working is received by this spindle B.

As shown in the drawing, the arm D′ supports the outer end of the counter-shaft. This is a mechanical advantage, as it allows the belt-pulley to be placed between two bearings instead of overhanging, which would be the case if it were suspended from a shaft simply running in a sleeve attached to the central spindle. This feature may be used or dispensed with without changing the character or the working of the machine in any way.

As shown in the drawing, the arms of the wheel C are curved or bent so as to extend from the rim of the wheel to the bottom of hub. This form, though possessing many advantages, is not essential. This wheel may be made in the usual form of a flat wheel, with a long sleeve or hub extending down a proper distance to allow of the attachment of the levers, so that they may pass under the intermediate gear-wheel G. The advantages of the form shown are that, if it is desired, the wheel G may revolve within the circumference of the wheel C, instead of without it, and this will allow the levers, if preferred, to be attached to the rim of wheel C, instead of the sleeve or hub of the same, thus avoiding the transmission of the power through the arms of the wheel, so that the wheel can be made, when relieved from this strain, much lighter; and in casting the straining incident to the shrinking unequally of the parts of the wheel in cooling is much relieved. This form of wheel may also be used with advantage where the wheel G is placed outside of the rim of wheel C. I do not, therefore, confine myself exclusively to the use of this form of wheel, as any of the forms in general use may be applied without changing the features or results produced by my invention.

I do not claim any of the elements of the combination shown when used separately and apart from this combination, as I am aware that, when so considered, they are old and in general use.

I claim as my invention—

1. The arrangement of the gear-wheel C, pinion F, shaft E, and wheel G, to allow the revolution of the wheel G within the wheel C, and to bring the shaft E at such height as to engage the pinion F.

2. In combination with above arrangement, the frame D D′, consisting of two arms provided with journals for the shaft E, the whole attached to the upper end of shaft B, substantially as herein described.

3. The central shaft or spindle, B D, having its lower portion, B, surrounded by the master-wheel C, and its upper portion, D, provided with bearings M N and arm D′ for the support of counter-shafts E and H, the shaft E carrying the pinion F, gearing with wheel C, and operating with reference to each other, substantially as described.

JAMES M. ALBERTSON.

Witnesses:

COLEBY C. JEFFERY,

NATHL. A. CHAPMAN.